United States Patent [19]

Minami

[11] 4,403,310
[45] Sep. 6, 1983

[54] FIXED DATA READING SYSTEM
[75] Inventor: Munehiro Minami, Hachioji, Japan
[73] Assignee: Tokyo Shibaura Denki Kabushiki Kaisha, Kawasaki, Japan
[21] Appl. No.: 305,799
[22] Filed: Sep. 25, 1981
[30] Foreign Application Priority Data Sep. 30, 1980 [JP] Japan ............................. 55-136561

[51] Int. Cl.³ .............................................. G11C 13/00
[52] U.S. Cl. ................................... 365/230; 365/189; 364/900
[58] Field of Search ................. 365/94, 103, 104, 189, 365/230, 239; 364/290

[56] References Cited

U.S. PATENT DOCUMENTS 4,039,785 8/1977 Ziemann ............................. 365/189

OTHER PUBLICATIONS

National Technical Report, vol. 25, No. 4, Aug. 1979, T. Sakao et al., "4-Bit One-Chip Computer MN 1500 Series".

Primary Examiner—Terrell W. Fears
Attorney, Agent, or Firm—Kenyon & Kenyon

[57] ABSTRACT

Disclosed is a fixed data reading system which comprises a read only memory for storing program data and fixed data, a random access memory for storing non-program data, a program counter for specifying a location of the read only memory, an incrementer for incrementing the contents of the program counter, and a program counter input register for supplying the incremented program counter contents to the program counter at a predetermined timing. The random access memory includes a data counter area for storing an address specifying a location of the read only memory in which the fixed data is stored. When the instruction for reading fixed data in the read only memory is decoded, an address is supplied from the data counter area allocated in the random access memory to the program counter. When executing an ordinary instruction, the corresponding address is supplied from the program counter input register to the program counter.

2 Claims, 15 Drawing Figures

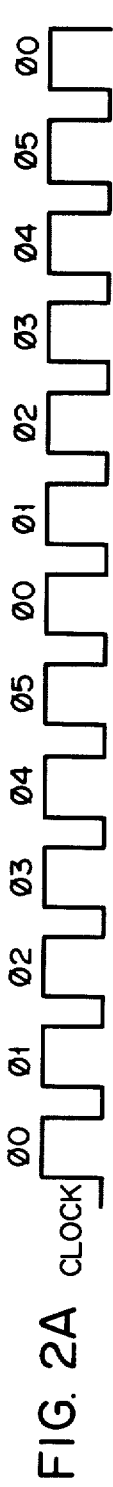
FIG. 2A CLOCK
FIG. 2B PC
FIG. 2C INC
FIG. 2D PCI
FIG. 2E IR
FIG. 2F RAM ADDRESS
FIG. 2G RAM DATA
FIG. 2H PC→RAM

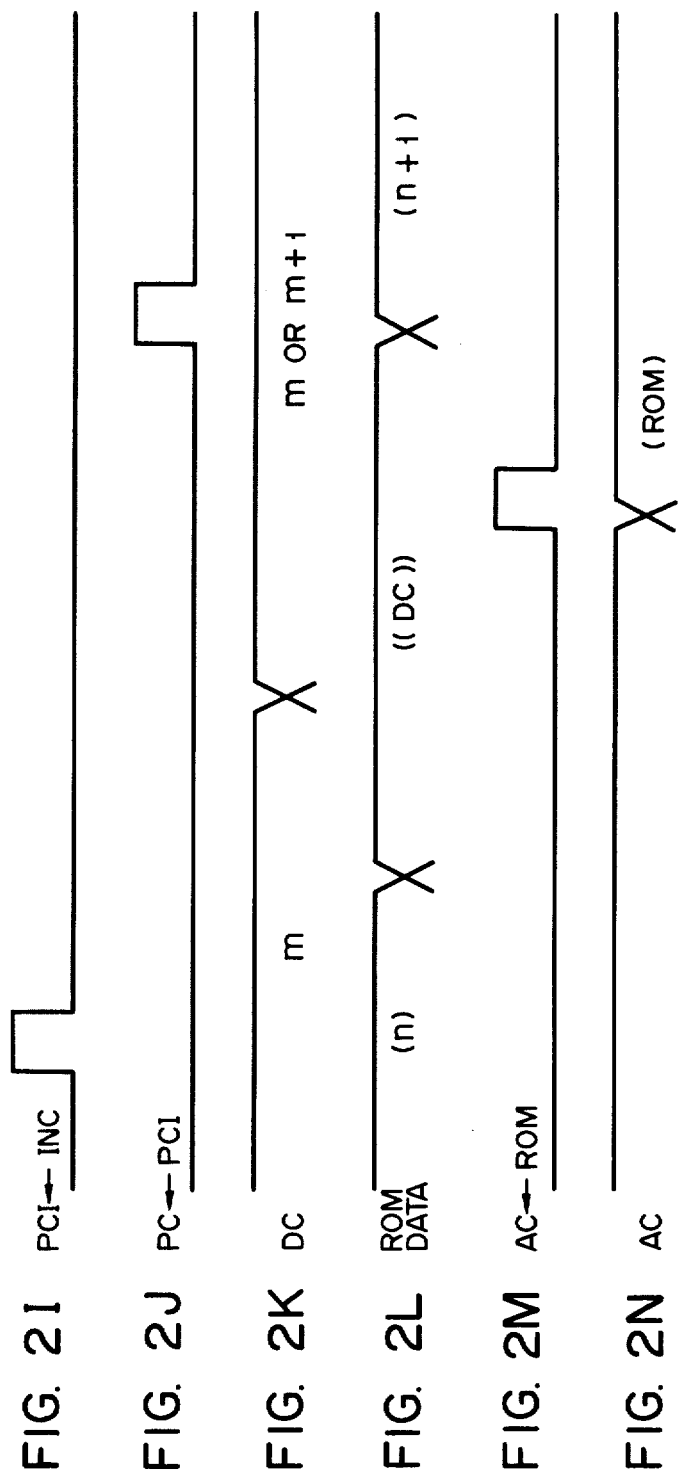

FIXED DATA READING SYSTEM

BACKGROUND OF THE INVENTION

This invention relates to a fixed data reading system for microcomputers.

Among programs of microcomputers such as 4-bit ones, a series of fixed data are often prepared for related processings. For example, those data are applied to the table look-up for conversion of seven-segment codes for numerical displays or to an electronic musical instrument wherein fixed waveforms are memorized as digital data and data successively output are converted into analog signals through a digital to analog conversion. In a microcomputer, programs or fixed data such as described above have to be stored in a memory. Generally, a microcomputer includes a random access memory (hereinafter referred to as RAM) for storing alterable data and a read only memory (hereinafter referred to as ROM) for storing programs. The fixed data are usually stored in successive addresses of ROM. To have access to and read the programs and the fixed data stored in the ROM, it is necessary to discriminate the addresses for the programs and those for the fixed data. Usually, a program counter (PC) for specifying and address for the program and a data counter (DC) for specifying an address for the fixed data are provided. The addresses for the fixed data have to be specified by the contents of the data counter which consists of registers. In a 4-bit or any other bit microcomputers, the RAM, ROM, PC, DC, etc. are constructed in a single chip. Here, the provision of DC, which serves a similar role to that of PC, increases the hardware cost and the chip area.

Among the prior art, there is National Technical Report Vol. 25, No. 4, August 1979, T. Sakao et al "4-bit One-Chip Microcomputer MN1500 Series". This one-chip microcomputer has a "table look-up function", and the addresses for ROM data to the read out are specified by using the program counter and two other registers. The microcomputer also includes a read table instruction (RDTBL) as a data transfer instruction. This instruction has a function of transferring the ROM data specified by the contents of a high portion of the program counter and an extended accumulator, to the extended accumulator.

SUMMARY OF THE INVENTION

An object of the present invention is to provide a fixed data reading system, which eliminates the drawbacks mentioned above, in which a RAM and a program counter are used for specifying the fixed data addresses, thus dispensing with the data counter to permit reductions of the hardware cost and the chip area.

To achieve the above-mentioned object, the fixed data reading system according to the present invention comprises a first memory for addressably storing program data and fixed data, a first register connected to said first memory for storing a first address designating a location in said first memory, an incrementer connected to said first register for incrementing the first address stored in said first register, a second register connected to said incrementer and said first register for receiving the output from said incrementer and feeding it to said first register at a predetermined timing, an instruction register for holding the instruction read out from said first memory, an instruction decoder for decoding the instruction fed from said instruction register, and a second memory for addressably storing non-program data and including a data counter area for storing a second address so that the second address of the location in which the fixed data is stored, is fed to said first register when an instruction for reading the fixed data stored in said first memory is decoded by said instruction decoder.

According to the invention, the fixed data stored in the ROM is read using the contents of the DC allocated in the RAM. The address for the fixed data which is the contents of the DC can be written into and read out of the RAM like any other data, and no special instruction is needed for the operations. For example, the address for the fixed data can be written into the RAM by using a store instruction which writes data of the accumulator into the RAM, and can be read out of the RAM and loaded in the accumulator by using an load instruction which reads data out of the RAM and loads the data into the accumulator.

BRIEF DESCRIPTION OF THE DRAWINGS

Other objects and features of the present invention will be apparent from the following description taken in connection with the accompanying drawings, in which:

FIGS. 2A to 2N are timing charts useful for explaining the operation of the embodiment shown in FIG. 1, in which FIG. 2A shows the waveform of a basic clock signal, FIG. 2B shows the contents of the PC, FIG. 2C shows the contents of the incrementer (INC), FIG. 2D shows the contents of the program counter input register (PCI), FIG. 2E shows the contents of an instruction register (IR), FIG. 2F shows the contents of a RAM address, FIG. 2G shows the data read out of a RAM data, FIG. 2H shows the timing signals transferred from the RAM contents of the PC, FIG. 2I shows the timing signals transferring the incrementer contents to the program counter input register, FIG. 2J shows a waveform of the timing of transfer of the program counter input register contents to the program counter, FIG. 2K shows the contents of the data counter area, FIG. 2L shows the data read out of the ROM, FIG. 2M shows the timing signal transferring the ROM contents to the accumulator (AC), and FIG. 2N shows the contents of the accumulator (AC).

DETAILED DESCRIPTION OF THE PREFERRED EMBODIMENT

Figure 1:
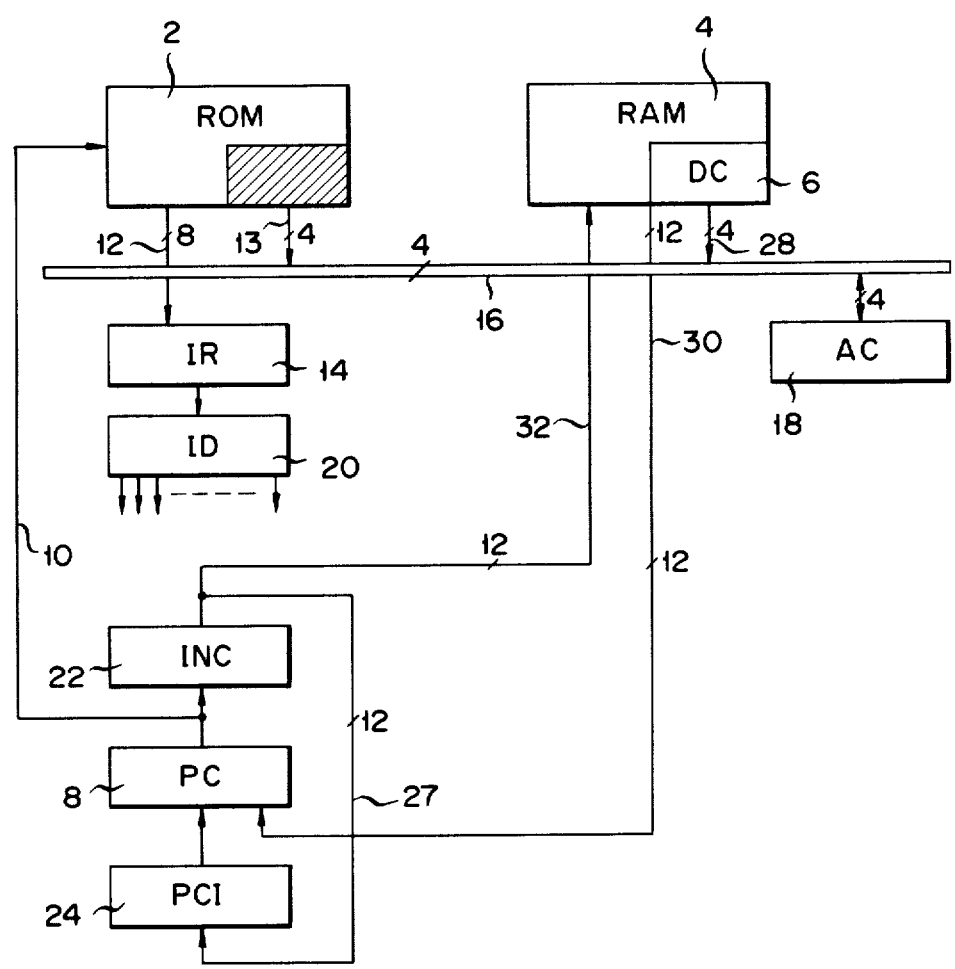
FIG. 1 is a block diagram showing an embodiment of the invention.

FIG. 1 shows a block diagram of part of a 4-bit microcomputer, to which the present invention is applied. This 4-bit microcomputer comprises two different memories, a read only memory (ROM) 2 for storing program data and fixed data, and a random access memory (RAM) 4 having a data and a data counter area 6. The ROM 2 is connected to a program counter (PC) 8 via an address line 10, and is also connected via an 8-bit output line 12 to an instruction register (IR) 14 and also via a 4-bit output line 13 and an internal bus 16 to the RAM 4 and to an accumulator 18. An instruction decoder 20 is connected to the IR 14 for decoding instructions produced from the IR 14 and generating various control signals. The output of the PC 8 is connected to an incrementer (INC) 22. The INC 22 has a function of incrementing the received data by +1. The output of the INC 22 is fed through a 12-bit input line 32 to the RAM 4, and is also fed through a 12-bit output line 27 to a program counter input register (PCI) 24. The PCI 24 is a buffer register for producing ROM address to the PC 8 at a predetermined timing. The output of the PCI 24 is fed to the PC 8. The RAM 4 is connected via 4-bit output line 28 to the internal bus 16, via a 12-bit output line 30 to the PC 8 and further via a 12-bit input line 32 to the INC 22.

Now, the operation of the embodiment of the present invention having the above construction will be described. When reading out an instruction stored in the ROM 2, the address of the location of the ROM 2 in which the instruction to be read out is stored is set as a 12-bit address data in the PC 8, and this data is fed to the ROM 2 through the address line 10 for specifying the address. The instruction stored in the location of the ROM 2 defined by the address is read out as 8-bit data, which are fed to the IR 14 and then to the ID 20 for its execution. At this time, the address held in the PC 8 is input to the INC 22 for being incremented (normally the address is incremented by +1 for the next instruction fetch). The output of the INC 22 is fed to the PCI 24. As the next address is fed from the PCI 24 to the PC 8, the next instruction is read out and executed. It is now assumed that an instruction stored in a location defined by an address "n" of the RAM 2 (fixed data read-out instruction) is read out before reading out fixed data stored in the ROM 2 according to the read-out instruction. For reading out fixed data, a data counter for setting and holding the address is necessary. According to the present invention, the RAM 4 includes a data counter area 6 (hereinafter referred to as DC) which occupies three 4-bit words (12 bits). For making access to the DC 6 of the RAM 4 and reading the contents of the DC, the address (DCA) of the least significant 4-bit word in the DC 6 is given to the RAM 4, and in the case of this instruction 12 bits including the most significant 2 words in the DC 6 are simultaneously read out. With the address "n" held in the PC 8 the address "n" is incremented by the INC 22 at the timing of the clock $\phi1$ as shown in FIGS. 2A and 2I, and the address "n+1" is fed to and held in the PCI 24. Further, the instruction stored in the location defined by the address "n" read out in accordance with the address specification of the PC 8 is input to the IR 14. Therefore the instruction for reading the fixed data stored in the address "n" is decoded and executed. Thus, access is made to the data in the RAM 4, i.e., the address (DCA) of the DC 6, and the contents thereof are read out. The contents of the DC 6, which are the 12-bit address "m" of fixed data are fed to the PC 8 through the output line 30 at the timing of the clock $\phi3$ as shown in FIGS. 2A and 2H. The timing at which the contents of the DC 6 are read out varies slightly depending on the access time for the RAM 4, but the appearance of the output has to be prior to the timing of the clock $\phi3$. The fixed data in the ROM 2 is read out by the address (m) which has been held in the PC 8. Although the data read out of ROM is an 8-bit data, only upper or lower 4 bits are selected and transferred through the bus 16 to the AC 18. Whether the read-out data is the upper 4-bit data or lower 4-bit data is determined by the type of an instruction. In this case, the upper 4-bit data corresponds to an instruction called LRH (load ROM higher nibble), and the lower 4-bit data to an LRL (load ROM lower nibble) instruction. The contents of the PC 8, i.e., the address "m", are supplied to the INC 22. After completion of data read out operation if the instruction code mentioned above represents LRH, the address "m" is incremented, and the incremented address is supplied through the input line 32 to the DC 6 in the RAM 4 to change the contents of the DC 6 to "m+1" as shown in FIG. 2K. When the instruction is LRL, the contents of the DC 6 are not incremented. It is to be understood that after the fixed data has been read out from the ROM 2, the address "n+1" held in the PCI 24 is supplied to the PC 8 at the timing of the clock $\phi3$, and the instruction specified by the address "n+1" is read out again from the ROM 2.

Since the fixed data stored in the ROM 2 is made access to and read out by the DC 6 allocated in the RAM 4, the address of the fixed data, which are the contents of the DC 6, can be written in and read out like any other data without need of any special instruction. For example, the data in the AC 18 may be written using a store instruction for writing a data into the RAM 4 and the contents of the DC may be read out of the RAM using a load instruction for reading out data from the RAM and load it into the accumulator.

What is claimed is:

1. A fixed data reading system comprising:
    A. a first memory for addressably storing program data and fixed data;
    B. a first register connected to said first memory for storing a first address designating a location in said first memory;
    C. an incrementer connected to said first register for incrementing the first address stored in said first register;
    D. a second register connected to said incrementer and said first register for receiving the output from said incrementer and feeding said output to said first register at a predetermined timing;
    E. an instruction regster for holding an instruction read out of said first memory;
    F. an instruction decoder for decoding the instruction fed from said instruction register; and
    G. a second memory for addressably storing non-program data and including a data counter area for storing a second address so that the second address of the location in which the fixed data is stored is fed to said first register when an instruction for reading the fixed data stored in said first memory is decoded by the instruction decoder.

2. A method for reading fixed data comprising the steps of:
    A. loading a first address of a program data location stored in a program data storage area of a first memory in a first register;
    B. fetching an instruction stored in said location corresponding to the first address of said first memory;
    C. incrementing the first address stored in said first register and supplying and incremented address to a second register;
    D. decoding said instruction fetched from said program data storage area at an instruction decoder; and
    E. storing a second location address of said first memory, which is stored in a data counter area in a second memory, in said first register, said fixed data being stored in the second location.

* * * * *